United States Patent [19]

Fukuhara et al.

[11] Patent Number: 5,247,590
[45] Date of Patent: Sep. 21, 1993

[54] SIGNAL ENCODING AND DECODING SYSTEM

[75] Inventors: Takahiro Fukuhara; Tokumichi Murakami, both of Kanagawa, Japan

[73] Assignee: Mitsubishi Denki Kabushiki Kaisha, Tokyo, Japan

[21] Appl. No.: 781,504

[22] Filed: Oct. 22, 1991

Related U.S. Application Data

[62] Division of Ser. No. 594,340, Oct. 9, 1990, Pat. No. 5,214,721.

[51] Int. Cl.$^5$ .......................... G06K 9/36; H04N 1/41
[52] U.S. Cl. ...................................... 382/56; 358/426
[58] Field of Search ............... 358/426, 432, 467, 433; 340/729; 395/120, 123, 126, 132; 382/56

[56] References Cited

U.S. PATENT DOCUMENTS

| | | | |
|---|---|---|---|
| 4,525,858 | 6/1985 | Cline et al. | 340/729 |
| 4,590,465 | 5/1986 | Fuchs | 340/729 |
| 5,025,375 | 6/1991 | Sugawara | 382/56 |
| 5,038,383 | 8/1991 | Usumoto et al. | 382/56 |
| 5,052,045 | 9/1991 | Peregrim et al. | 382/56 |
| 5,056,154 | 10/1991 | Aono et al. | 382/56 |
| 5,065,446 | 11/1991 | Suzuki et al. | 382/56 |
| 5,144,688 | 9/1992 | Bovir et al. | 382/56 |

OTHER PUBLICATIONS

J. Ostermann et al "Object-Oriented Analysis-Synthesis Coding based on Moving 3D objects" 1989 pp. 1-2.
Galla et al "Facial Features Extraction in Video Telephone Images" (no date).
Aizawa et al "Model-Based Analysis Synthesis Image Coding System for Very Low-Rate Image Transmission" (no date).

Primary Examiner—Leo H. Boudreau
Assistant Examiner—David R. Anderson
Attorney, Agent, or Firm—Wolf, Greenfield & Sacks

[57] ABSTRACT

An encoding/decoding apparatus is described wherein an encoding apparatus comprises a feature-image-extracting section, a three-dimensional shape model adjustment section, a brightness information detection section, a patch dividing section and a threshold processing section, and a decoding apparatus comprises a three-dimensional shape model forming section and a synthesizing section. Feature image information extracted from input signals by the extracting section is adjusted with three-dimensional shape basic model information by the adjustment section and then a brightness diffusion value for each triangle patch constituting the adjusted three-dimensional shape model is detected by the detection section. When the detected diffusion value is larger than a predetermined value, the processing section subjects the dividing section to divide the patch into three small patches, and the brightness diffusion value for each small patch is further detected by the detecting section, while the former is lower than the latter, the processing section encodes the brightness information for the patch by referring to a code book storing different brightness information. The encoded information is then transmitted to the decoding apparatus, together with the divided patch information. At the decoding apparatus, output image signals are reproduced from the received information by referring to the contents of a three-dimensional shape model database and a brightness information dynamic code book.

4 Claims, 9 Drawing Sheets

Fig.2(a)
(PRIOR ART)
Fig.2(b)
(PRIOR ART)
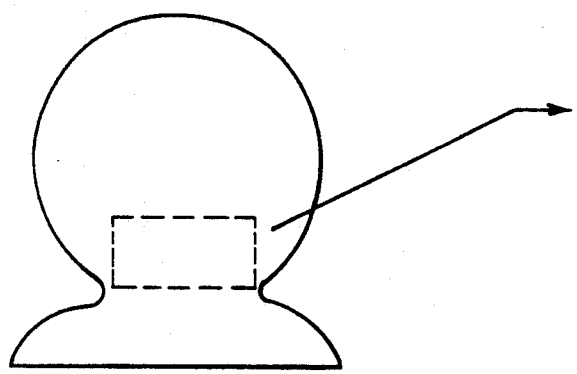
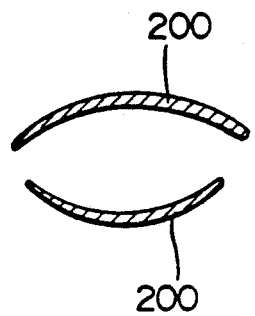
Fig.3
(PRIOR ART)
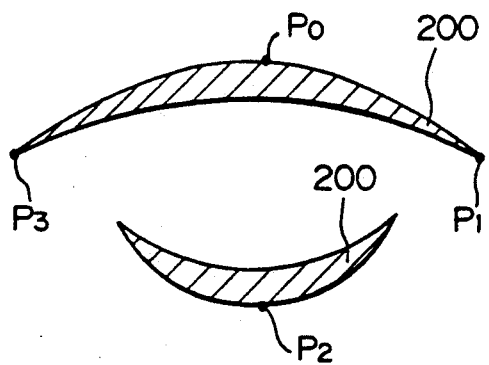

SIGNAL ENCODING AND DECODING SYSTEM

This application is a division of application Ser. No. 07/594,340, filed Oct. 9, 1990, now U.S. Pat. No. 5,214,721.

BACKGROUND OF THE INVENTION

1. Field of the Invention

The present invention relates to an encoding/decoding system adapted to analyze and identify digital input image signals and encode them, and transmit the analyzed and encoded signals to a receiver at which the encoded signals are decoded.

2. Description of the Prior Art

FIG. 1 is a block diagram illustrating an encoder realizing an intellectual encoding according to a prior art disclosed for example in Japanese Patent Public Disclosure (Kokai) No. 7787/89 Official Gazette. In the diagram, numeral 1 is a feature-image-extracting section adapted to extract signals of pixels corresponding to a predetermined feature part in an image from digital input image signals and to output feature signals, 2 a position information detecting section adapted to receive the feature signals from the section 1 and search positions of individual elements constituting the feature part, 3 a position information expressing section adapted to express in numerical values the signals from the detecting section 2 and to output element position signals, 4 a shape information detecting section adapted to receive the feature signals from the section 1 and detect the shape of the elements of the feature part, and 5 a shape information expressing section adapted to express in numerical values the signals output from the detecting section 4 and to output element shape signals.

These signals from the sections 3 and 5 are transmitted to a receiver and decoded.

Operation of the encoder described above will be explained on the assumption that the image represented by the input image signals is a human face as shown in FIG. 2(a) and the predetermined feature part of the face image is a mouth portion as shown in FIG. 2(b).

The extracting section 1 functions to extract the mouth portion encircled by the dotted line in the face image shown in FIG. 2(a), and output mouth part signals as the feature signals to the position and shape information detecting sections 2 and 4. The position information detecting section 2 functions to search actual positions of the respective elements 200 shown in FIG. 2(b), or upper and lower lips on the whole image, and the position information expressing section 3 transforms the signals from the section 2 to signals expressed in the form of absolute coordinates based on the whole frame and outputs the element position signals.

On the other hand, the shape information detecting section 4 functions to analyze the shape of the elements 200 and detect suitable feature points $P_0$, $P_1$, $P_2$ and $P_3$ which are end points and center points of the elements 200 as shown in FIG. 3. The shape information expressing section 5 operates to detect the coordinate values of the feature points, $P_0(X_0, Y_0)$, $P_1(X_1, Y_1)$, $P_2(X_2, Y_2)$ and $P_3(X_3, Y_3)$ as shown in FIG. 4(a), and the calculate and output parameters l, p, d and $\alpha$ of the feature image shape as shown in FIG. 4(b), where l is a length from points $P_1(X_1, Y_1)$ to $P_3(X_3, Y_3)$ for representing a mouth size, p and d are relative parameters to express the shape of the mouth image, and $\alpha$ is an inclination of the line $P_1P_3$ from the horizontal line.

According to the intellectual encoder constituted as described above, there has been such a problem that when a new shape not recorded in a memory set in the sections 4 and 5 is detected in the input image, it is impossible to detect such a shape or it is likely to be erroneously detected due to a lack of knowledge for detecting such a shape or a position thereof.

There has also been another problem wherein even if the shape and position of the input image do not change, but if luminance information of pixels (picture elements) constituting the feature image are considerably changed, the output image may be fairly different from the input image when pixel luminance information in the first frame is used for decoding at receiver.

There has been a further problem that since the brightness information of images has to be stored at both of the transmission side and the reception side for every pixel, the utility capacity of the memory is large.

Furthermore, when an object image moves vigorously, it may not be possible to transmit the object image information at a low rate because the amount of brightness information to be transmitted is large.

SUMMARY OF THE INVENTION

The present invention has been provided to solve the problem as mentioned above, and an object of the present invention is to provide an encoding/decoding system for image signals capable of realizing transmission at low bit rate as well as largely reducing the utility capacity of a memory even when a vigorously moving object image is detected and/or brightness values of the pixels of a feature image is largely varied.

The object of the present invention as described above is attained by an encoding/decoding system comprising encoding and decoding apparatuses, wherein the encoding apparatus includes triangle patch division means for dividing a triangle patch which is the element of a three-dimensional shape model of a feature image into a plurality of small triangle patches when the brightness diffusion value of the triangle patch is larger than a predetermined value and for providing divided triangle patch information, and means for providing index information corresponding to luminance information of each of the triangle patches including the small triangle patches by referring to a code book, and the decoding apparatus includes means for reproducing feature image information from three-dimensional shape model information formed from the divided triangle patch information and three-dimensional shape basic model information and the index information as well as luminance information from a code book incorporated therein.

BRIEF EXPLANATION OF THE DRAWINGS

FIGS. 2(a) and 2(b) illustrate an input image and a feature image extracted by an encoder as shown in FIG. 1;

FIG. 3 illustrates a shape of a feature image detected by an encoder as shown in FIG. 1;

DESCRIPTION OF THE PREFERRED EMBODIMENTS

Figure 5:
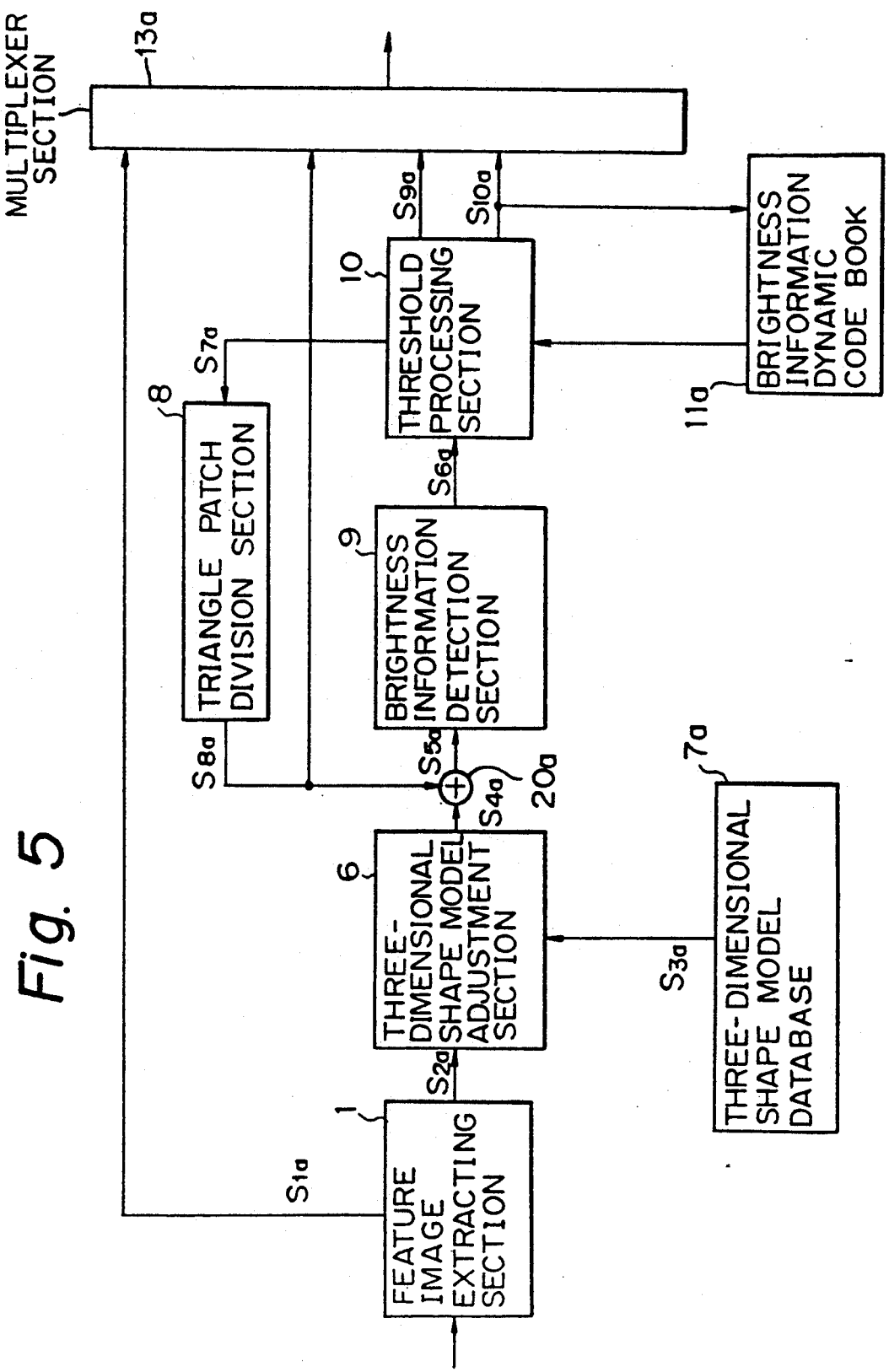
FIG. 5 is a block diagram illustrating an encoding apparatus according to the present invention.

FIG. 5 illustrates an embodied diagram of an encoding apparatus of the present invention.

In the drawing, numeral 1 designates a feature-image-extracting section adapted to separate input image signals into background image information $S_{1a}$ and feature image, or object image information $S_{2a}$, 6 a three-dimensional shape model adjustment section adapted to adjust the feature image $S_{2a}$ output from the section 1 with a basic three-dimensional shape model information $S_{3a}$ stored in and read out from a three-dimensional shape model database 7a to provide an adjusted three-dimensional shape model information $S_{4a}$, 9 a brightness information detection section adapted to detect brightness information $S_{6a}$ including brightness diffusion information in respective triangle patches which are the elements constituting the adjusted three-dimensional shape model represented by information $S_{5a}$ including the information $S_{4a}$ and information $S_{8a}$ described below, 10 a threshold processing section adapted to compare the detected brightness diffusion information output from the section 9 with a predetermined threshold value, 8 a triangle patch division section adapted to divide the patch into three small triangle patches to provide divided triangle patch information $S_{8a}$, 11a a dynamic code book for brightness information capable of reading out/writing in, 13a a multiplexer section adapted to multiplex the background image information $S_{1a}$ output from the feature-image-extracting section 1, index information $S_{9a}$ output from the threshold processing section 10, the divided triangle patch information $S_{8a}$ output from the division section 8 and new brightness information $S_{10a}$ which is newly registered in the code book 11a. Numeral 20a designates an adder adapted to add the information $S_{4a}$ and $S_{8a}$ to provide the three-dimensional shape model information $S_{5a}$.

Figure 6:
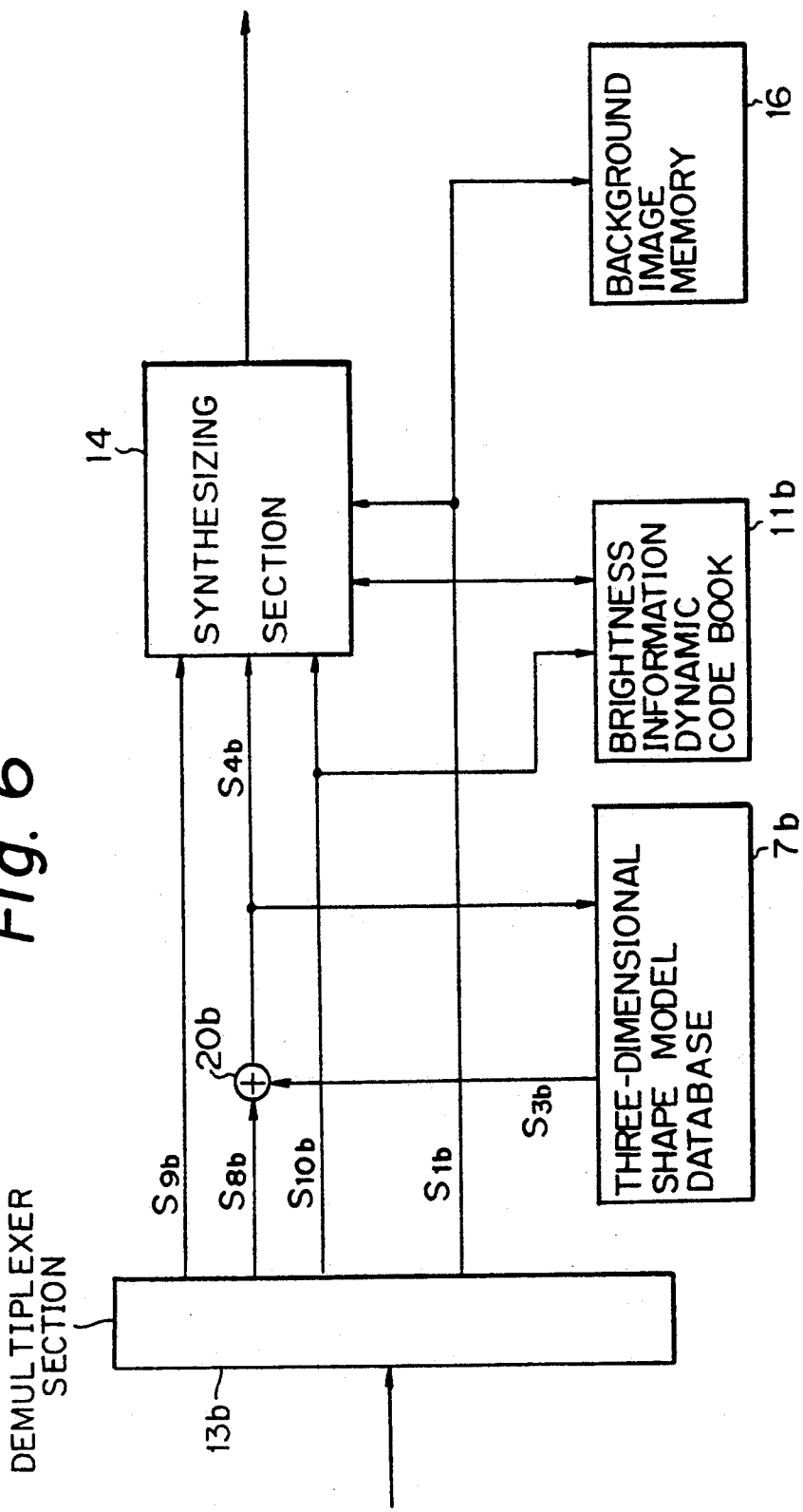
FIG. 6 is a block diagram illustrating a decoding apparatus according to the present invention.

FIG. 6 shows an embodiment of a decoding apparatus according to the present invention, wherein numeral 13b designates a demultiplexer section adapted to demultiplexer the received signals transmitted from the encoding apparatus shown in FIG. 5 into 9 background image, index, divided triangle patches and new information $S_{1b}$, $S_{9b}$, $S_{8b}$ and $S_{10b}$ corresponding to the information $S_{1a}$, $S_{9a}$, $S_{8a}$ and $S_{10a}$, 7b a three-dimensional shape model database storing the same basic model information $S_{3b}$ as that of the database 7a shown in FIG. 5, 20b an adder adapted to add the information $S_{8b}$ and $S_{3b}$ to provide three-dimensional shape model information $S_{4b}$, 11b a brightness information code book having the same constitution as that of the code book 11a shown in FIG. 5, 14 a synthesizing section adapted to provide output signals by synthesizing the background image information $S_b$ and feature image information formed by referring to the index information $S_{9b}$, the three-dimensional shape model information $S_{4b}$ and the new brightness information $S_{10b}$ as well as the information read out from the code book 11b, and 16 a background image memory adapted to store the background image information $S_{1b}$.

Operation of the system comprising the encoding and decoding apparatus shown in FIGS. 5 and 6 will next be explained as follows.

Figure 7B:
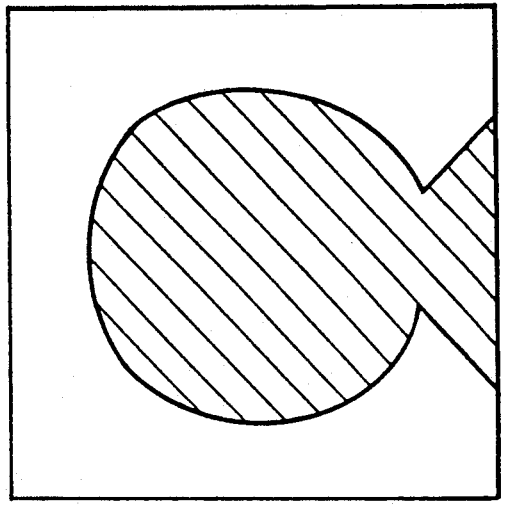
FIGS. 7(a) and 7(b) illustrate background and feature (face) images separated by a feature-image-extracting section shown in FIG. 5.
Figure 7A:
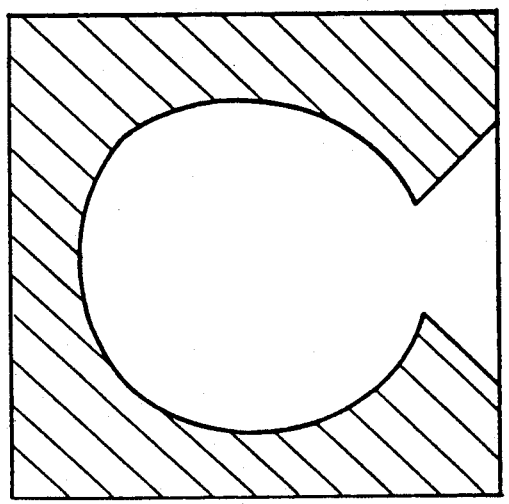

Should the input image signals represent for example a human face image with a background image, this image signals are divided by the feature image extraction section 1 into the background image information $S_{1a}$ representing the background image as shown in FIG. 7(a) and the feature image information $S_{2a}$ representing the face image as shown in FIG. 7(b). Then the three-dimensional shape basic model information $S_{3a}$ stored in the database 7a is adjusted by the adjustment section 6 with the feature image information $S_{2a}$ to provide the adjusted model information $S_{4a}$ representing an image as shown in FIG. 8(a). The information $S_{4a}$ is added to the divided patch information $S_{8a}$ output from the triangle patch division section 8 at the adder 20 and the added information is input to the brightness information detection section 9 as the three-dimensional shape model information $S_{5a}$. The information $S_{5a}$ represents an image as shown in FIG. 8(b).

Figure 8B:
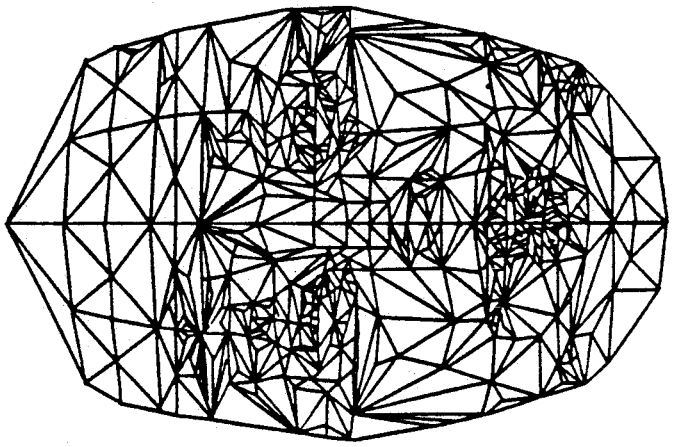
FIGS. 8(a) and 8(b) show three-dimensional shape models having a polygon expression.
Figure 8A:
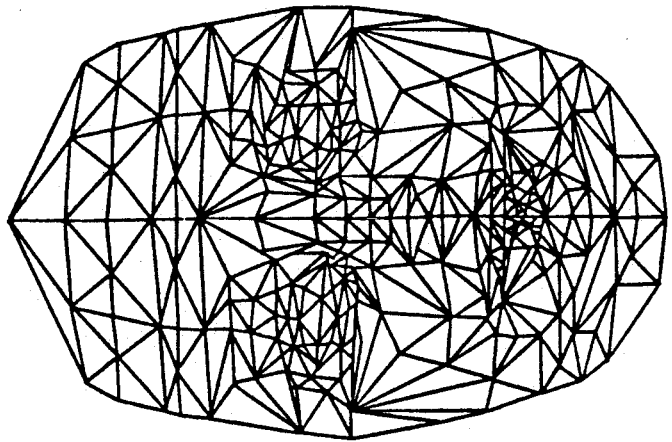
Figure 9:
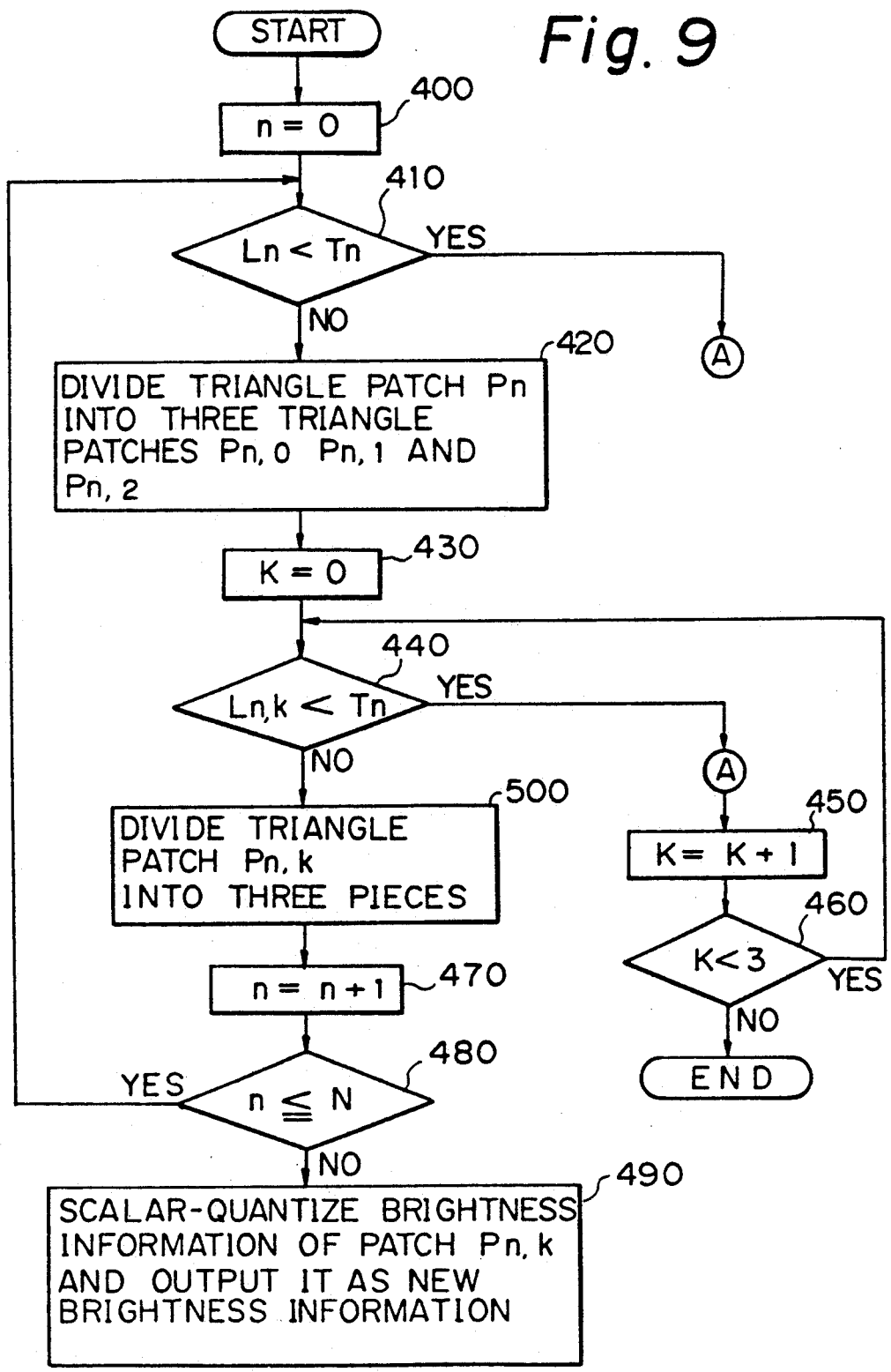
FIG. 9 is a flow chart for explaining a processing operation of brightness information detection, threshold processing and triangle patch division sections incorporated in the encoding apparatus shown in FIG. 5.

The detection section 9 calculates a brightness diffusion value in each triangle patch of the three-dimensional shape model image as shown in FIG. 8(b) and outputs the patch brightness diffusion information as well as the brightness information $S_{6a}$ to the threshold processing section 10, at which difference between the diffusion value and the predetermined threshold value is calculated. Flow of the process at the sections 8, 9 and 10 and the adder 20a will be explained in accordance with the flow chart shown in FIG. 9.

At step 410, the diffusion value $L_n$ of the triangle patch $P_n$ at n-th hierarchization is calculated by the brightness information detection section 9 as follows:

$$L_n = \frac{1}{M_o} \sum_{i=1}^{M_o} (J_{n(i)} - V_n)^2$$

where $M_o$: a number of pixels of the patch $P_n$ $J_{n(i)}$: a brightness value of a pixel numbered i (i=1, 2, ... $M_o$) of the patch $P_n$ $V_n$: an average value of the brightness values $\{J_{n(i)}\}$;

$$V_n = \frac{1}{M_o} \sum_{i=1}^{M_o} J_{n(i)}$$

The diffusion value $L_n$ is then compared with the threshold value $T_n$ of brightness diffusion at the n-th hierarchization, by the processing section 10.

Figure 10:
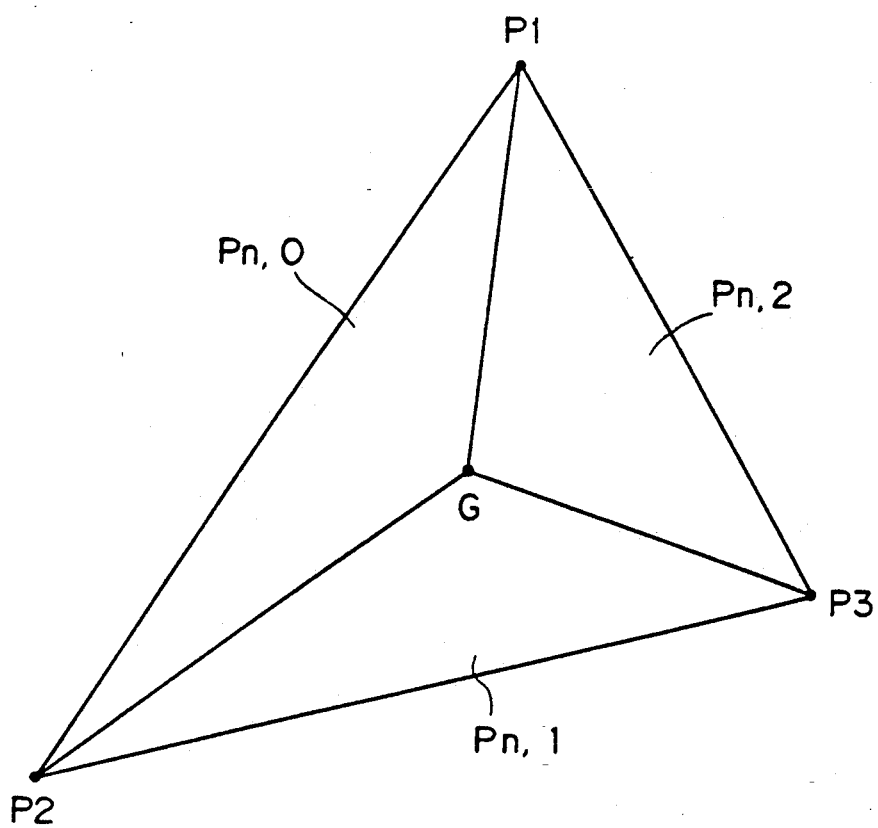
FIG. 10 shows an example of three triangle patches obtained by dividing a basic triangle patch.

If $L_n < T_n$, the flow proceeds to the processing step A, while if $L_n \geq T_n$, the flow goes to step 420, where the triangle patch $P_n$ is divided into three triangles $P_{n,0}$, $P_{n,1}$ and $P_{n,2}$ by the triangle patch division section 8. These triangles $P_{n,0}$, $P_{n,1}$, $P_{n,2}$ are provided by dividing along three lines between the gravity point G and the three apexes $P_1$, $P_2$ and $P_3$ of the patch $P_n$ as shown in FIG. 10.

Subsequently, the divided patches are incorporated into the adjusted three-dimensional shape model by the adder 20a to provide a new three-dimensional shape model, and then at the step 440, the diffusion calculation and the threshold comparison for each of patches $P_{n,0}$, $P_{n,1}$ and $P_{n,2}$, in a manner similar to the step 410.

That is; at the step 440, the following calculation is executed to provide the brightness diffusion value $L_{n,k}$ for the patch $P_{n,k}$ (k=0, 1, 2);

$$L_{n,k} = \frac{1}{M_k} \sum_{i=1}^{M_k} (J_{n,k(i)} - V_{n,k})^2$$

where $M_k$ : a number of pixels of the patch $P_{n,k}$ $J_{n,k(i)}$: a brightness value of a pixel numbered i (i=1, 2, ... $M_k$) of the patch $P_{n,k}$ $V_{n,k}$: an average value of the brightness values $\{J_{n,k(i)}\}$;

$$V_{n,k} = \frac{1}{M_k} \sum_{i=1}^{M_k} J_{n,k(i)}$$

If $L_{n,k} < T_n$, the processing flow goes to the process step A. After that number k is added by 1 at step 450 and the diffusion calculation and the threshold comparison are repeated until $k \geq 3$. On the other hand, if $L_{n,k} \geq T_n$, the triangle patch $P_{n,k}$ is further divided into three sections by the division section 8 at step 500. After completing step 500, the number n is added by one and then the process returns to step 410, whereby the similar processing is executed for a patch numbered by n+1.

If the hierarchization n exceeds a final hierarchization number N, which is detected at step 480, the flow proceeds to step 490 to scalar-quantize the brightness information of the patch $P_{n,k}$ and to output it to the multiplexer section 13a as the new brightness information $S_{10a}$. At the same time, the new brightness information $S_{10a}$ is registered into the dynamic code book 11a.

Next, a processing operation at step A processed by the threshold processing section 10 will be discussed.

Let $L_n(Y_n, C_{bn}, C_{rn})$ and $D_i(Y_i, C_{bi}, C_{ri})$ be a representative brightness value of the patch $P_n$ and a brightness value registered at an i-numbered address of the dynamic code book 11. The square absolute value $d_i$ of the difference between the values $L_n(Y_n, C_{bn}, C_{rn})$ and $D_i(Y_i, C_{bi}, C_{ri})$ will be calculated in accordance with the following equation;

$$d_i = |L_n - D_i|^2$$
$$= |(Y_n, C_{bn}, C_{rn}) - (Y_i, C_{bi}, C_{ri})|^2$$

The value $d_i$ is obtained for every i and the minimum value $d_{io}$ in the values $\{d_i\}$ is determined to provide io as the index information $S_{9a}$. That is;

$$d_{io} = Min.\{d_i\}$$

Figure 1:
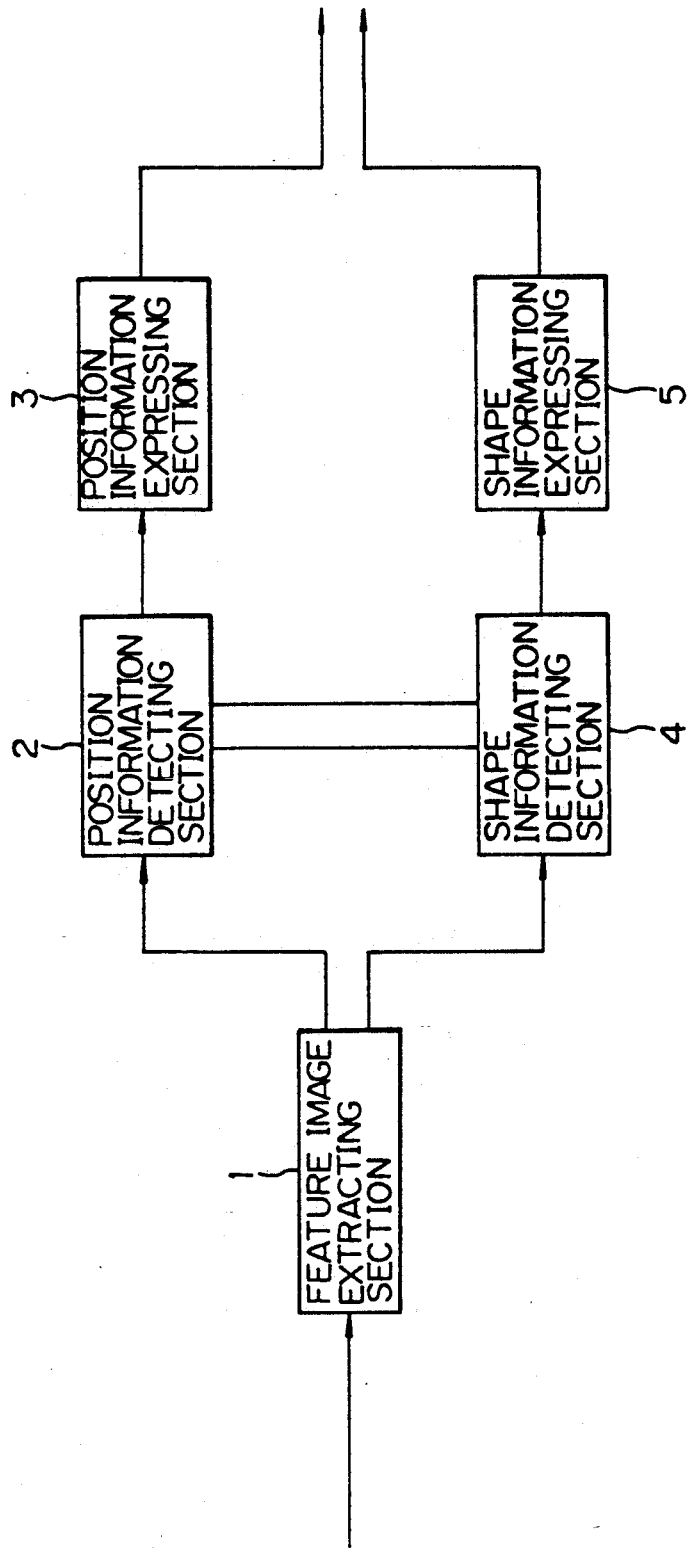
FIG. 1 is a block diagram illustrating an encoder according to a prior art.
Figure 4B:
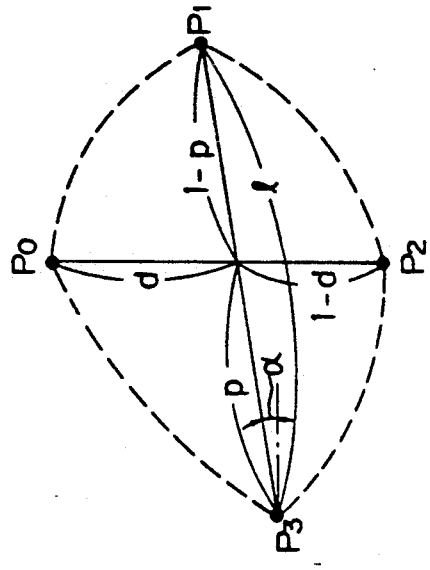
FIGS. 4(a) and 4(b) illustrate explanatory views for explaining numerical values output by an encoder as shown in FIG. 1.
Figure 4A:
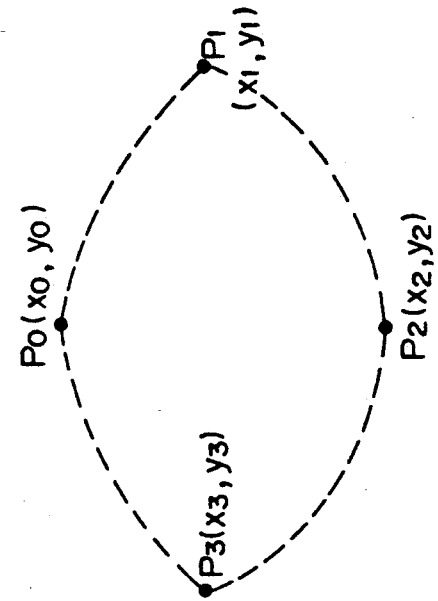

The three-dimensional shape model after the n-th hierarchization will be as shown in FIG. 4(b).

In accordance with the processing steps as described above, the divided triangle patch information $S_{8a}$, the index information $S_{9a}$, the new brightness patch information $S_{10a}$ are generated, and input to the multiplexer section 13a, together with the background information $S_{1a}$ to form the multiplexed transmission signals.

At the decoding apparatus shown in FIG. 6, the received multiplexed signals are separated into the individual information $S_{1b}$, $S_{8b}$, $S_{9b}$ and $S_{10b}$.

The divided triangle patch information $S_{8b}$, which represents such newly divided triangle patches as shown in FIG. 10, is added with the three-dimensional shape basic model information $S_{3b}$ stored in the database 7b at the adder 20b, and then the added information as an integral three-dimensional shape model information $S_{4b}$ is provided to the synthesizing section 14.

The new brightness patch information $S_{10b}$ is newly registered in the dynamic code book 11b and also input to the synthesizing section 14. The index information $S_{9b}$ is once input to the synthesizing section and then retrieved in the dynamic code book 11b so that the specified brightness information registered in the address corresponding to the index information $S_{9b}$ in question is read out from the code book 11b.

In the mean time, the background image information $S_{1b}$ is provided to the synthesizing section 14 and also stored in the background image memory 16. At this time, when no background image information is received at the synthesizing section 14, the section 14 read out the background image information from the memory 16, which has been stored therein.

The synthesizing section 14 produces output image signals corresponding to the input image signals in accordance with the brightness information read from the code book 11b, such as the integrated three-dimensional shape model information $S_{4b}$, the new brightness patch information $S_{10b}$, and the background image information $S_{1b}$.

As described above, in the encoding apparatus shown in FIG. 5, the triangle patch division section 8 divides the patch by defining the gravity point G of the patch $P_n$ as shown in FIG. 10. A manner of definition of the gravity point G will be explained by referring to FIG. 10.

Assuming that the coordinates of the apexes $P_1$, $P_2$ and $P_3$ be $(X_1, Y_1, Z_1)$, $(X_2, Y_2, Z_2)$ and $(X_3, Y_3, Z_3)$, the coordinate $(X, Y, Z)$ of the center G will be defined by the following equation;

$$G(X, Y, Z) = G\left(\frac{X_1 + X_2 + X_3}{3}, \frac{Y_1 + Y_2 + Y_3}{3}, \frac{Z_1 + Z_2 + Z_3}{3}\right)$$

In the above-mentioned embodiment, the triangle patches are prepared by being divided along the lines between the gravity point G determined above and the respective three apexes. However, it is to be noted that the manner of the divided triangle patch preparation is not limited to that described above but the patch may be divided into three portions in accordance with the brightness distribution with the patch. In such a manner, the same effect as that obtained by the embodiment described above may be derived.

Many modifications and variations of the present invention are obviously possible.

What is claimed is:

1. An encoding and decoding system for image signals comprising an encoding apparatus for encoding said image signals as encoded signals and transmitting the encoded signals and a decoding apparatus for decoding received encoded signals transmitted from said encoding apparatus, wherein said encoding apparatus comprises:

means for separating said image signals into background image information and feature image information;

means for adjusting said feature image information output from said separating means with three-dimensional shape basic model information to provide adjusted feature image information;

means for detecting a brightness diffusion value in each of triangle patches constituting a three-dimensional shape model represented by said adjusted feature image information, and for forming brightness information of each triangle patch;

means for dividing said triangle patch into a plurality of divided triangle patches to provide divided triangle patch information to said detecting means for detection of said brightness diffusion value;

processing means for comparing said brightness diffusion value output from said detecting means with a predetermined threshold value, wherein when the former is higher than the latter, said processing means provides the corresponding patch or the corresponding divided patch to said dividing means to divide the patch, while when the former is lower than the latter said processing means outputs index information associated with said brightness information output from said detecting means by referring to a code book storing brightness information; and means for multiplexing said background image information output from said separating means, said index information output from said processing means and said divided triangle patch information output from said dividing means to transmit them to said decoding apparatus; and said decoding apparatus comprises;

means for demultiplexing the received signals into said background image information, said index information and said divided triangle patch information;

means for adding the same three-dimensional shape basic model information as that in said encoding apparatus to said divided triangle patch information to provide three-dimensional shape model information;

means for reproducing brightness information associated with said index information by referring to a second code book having the same content as that of said code book in said encoding apparatus; and means for combining said three-dimensional shape model information and said brightness information as well as said background image information to provide a whole output image signal.

2. A decoding system for image signals comprising:

means for receiving a multiplexed signal comprising background image information, index information and brightness diffusion values for triangle patches;

means for demultiplexing said signal into said background image information, said index information and said brightness diffusion values for said triangle patches;

means defining a 3-dimensional shape basic model comprising, brightness diffusion values for triangle patches of said 3-dimensional shape basic model;

means for adjusting said brightness diffusion values for said triangle patches using said 3-dimensional shape basic model to provide adjusted brightness diffusion values for said triangle patches;

codebook means for holding stored brightness diffusion values for said triangle patches;

means for obtaining said stored brightness diffusion values from said codebook means, according to said index information; and means for combining said stored brightness diffusion values obtained by said means for obtaining, said adjusted brightness diffusion values for said triangle patches and said background image information to provide a whole output image signal.

3. A system according to claim 2, said decoding apparatus further comprising:

means for storing said background information received by said demultiplexing means, and means for retrieving previously stored background information.

4. A system according to claim 2, further comprising:

means for storing said stored brightness diffusion values for said triangle patches in said codebook means.

* * * * *

UNITED STATES PATENT AND TRADEMARK OFFICE
CERTIFICATE OF CORRECTION

PATENT NO. : 5,247,590
DATED : September 21, 1993
INVENTOR(S) : Takahiro Fukuhara and Tokumichi Murakami It is certified that error appears in the above-identified patent and that said Letters Patent is hereby corrected as shown below:

On the Title Page, add;

-- [30] Foreign Application Priority Data

Oct. 11, 1989 [JP] Japan 264296/1989 --.

Signed and Sealed this

Nineteenth Day of April, 1994

Attest:

BRUCE LEHMAN

*Attesting Officer*      *Commissioner of Patents and Trademarks*